Jan. 13, 1970  G. COTE  3,488,803
SYSTEM FOR MANUFACTURE OF PLASTIC ARTICLES
Filed June 20, 1966

INVENTOR
Gustave COTE
BY

ATTORNEY

United States Patent Office 3,488,803
Patented Jan. 13, 1970

3,488,803
SYSTEM FOR MANUFACTURE OF
PLASTIC ARTICLES
Gustave Cote, Ste.-Claire, Dorchester, Quebec, Canada, assignor to Beloit Corporation, Beloit, Wis.
Filed June 20, 1966, Ser. No. 558,850
Int. Cl. B29c 5/06
U.S. Cl. 18—5                                 3 Claims

ABSTRACT OF THE DISCLOSURE

A blowing system for making hollow plastic articles from an extruded plastic tube comprising a pair of mold sections closable upon one another to define a cavity having the shape of the article to be molded and when closed defining a through passage leading into the cavity, the passage having a plug portion of plastic material at one end thereof. A shear plate is mounted on one mold section to overhang therefrom whereby to overlap the other mold section and the passage when the mold is closed. An air pipe is mounted on the shear plate with a nozzle disposed with respect to the plug portion in such a way as to blow air through and into the passage when the mold is closed about a portion of an extruded plastic tube so as to expand the plastic tube into contact with the cavity.

The present invention relates to a new method of making hollow articles of plastic material from an extrusion tube of such material and to a system or device for applying the said method.

The method and the system of the invention generally relate to the art of blow molding of plastic articles by injecting air into a parison tube imprisoned between the sections of a sectional mold closed one over the other, the air expanding the plastic material into contact with the mold cavity.

In the application of the general method described above, needles are used adapted to pierce the plastic parison or tube either laterally or at one end along the longitudinal axis thereof, the needles acting as a nozzle and having a central passage for the ejection of the air.

Several difficulties are encountered in the use of such needles. When the needle is applied against the hot plastic of the parison or tube, very often the tube wall is not completely pierced and a thin membrane covers the tip of the needle. When air is blown, a bubble is formed until finally when enough pressure has been admitted through the needle, the bubble burst and air inflates the tube. However, when air is eventually exhausted, part of the plastic material that formed the bubble sticks to the needle and partially or completely closes the air passage and cools therein forming a plug preventing further use of the needle. Usually, one or two bottles are lost before the machine is stopped in order to clean or change the needle.

Although complete or partial plugging of the needle may be infrequent, it is necessary that maintenance of the needle be done after a certain number of bottles have been blown to remove plastic material that may have frozen thereon and also to sharpen it. Every time maintenance has to be done, which may be 3 or 4 times a day or even more depending on the rate of production, time is lost and consequently the production rate drops thus increasing the unit cost of the bottle, let alone the requirement that a relatively skilled mechanic be at attendance.

I have found that the above disadvantages may be overcome by having a restricted plug of plastic material formed at one end of the parison tube when the mold is closed, the plug leading to the outside of the mold so that a jet of air may be applied directly thereagainst to pierce the plug and blow air into the bottle to expand the plastic material in contact with the mold cavity. In this manner, the use of needles is completely eliminated and the afore-described inconveniences are overcome permitting a continuous trouble free production.

The system or device used for the application of the above-described method comprises a pair of mold sections adapted to come one against the other, the mold being so shaped as to define a passage for the formation of the aforesaid plastic material plug. One of the mold sections has a shear plate adapted to sever the plastic tube being blown from the extruded parison and being provided, at the same time, with an air blowing means having a nozzle so disposed as to register with the passage when the sectional mold is closed.

The timing of the air jet or burst is obtained in the same manner as in conventional needle blowing system.

It is believed that a better understanding of the invention will be afforded by the following description having reference to the appended drawing wherein.

Figures 1, 2, 3:
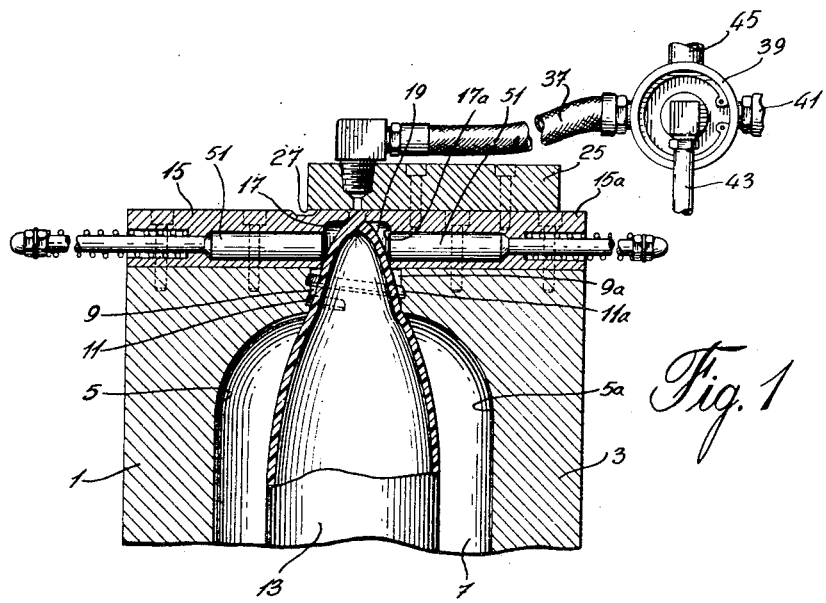
FIGURE 1 is a cross-sectional view through the top part of a sectional mold, made according to the invention.
FIGURE 2 is a perspective view of the top part of one mold section, the plastic tube having been imprisoned within the mold and sheared off the plastic parison.
FIGURE 3 is a partial cross-sectional view, on a larger scale of the top part of a sectional mold according to the invention, part of the plastic parison being also shown in cross section.

It will be observed that only the top part of a sectional mold has been shown for the purpose of simplicity and clarity, it being understood that the lower part thereof is of a conventional nature, the reader being referred to prior publications for that purpose, such as FIGURES 3 and 4 of U.S. Patent No. 2,750,624.

According to the present invention, the mold sections 1 and 3 intended, when closed one upon the other, to provide the sectional mold required, are each formed with a hollow part 5–5a through the respective abutting walls to define a cavity 7 having the shape of the desired container. In the particular instance considered, the container has a bottleneck and for that purpose each mold section defines a bottleneck-forming cavity 9–9a having the usual thread defining grooves 11–11a.

One face of each mold section 1, 3 corresponding to one end of the plastic tube 13 is provided with an extruder plate 14, 15a respectively that may be retained thereagainst by any suitable means. One edge of the extruder plate 15, 15a is flush with the corresponding mold section 1 or 3. Along the said edges and centrally thereof, registering grooves 17, 17a are provided that define what may be called a blowing chamber 19 when the sectional mold is closed. Second registering grooves 21, 21a are provided at the top part of the extruded plates 15, 15a to define an air passage 23 when the two mold sections 1, 3 are in abutment. This air passage is preferably chamfered at the outer end thereof as clearly shown in FIGURE 3.

It will be noted that the diameter of the cylindrical air chamber formed by first grooves 17, 17a lies between the diameters of the cylindrical air passage 23 and the bottleneck cavity formed by the second grooves 9, 9a. In this manner, the extruder plates 15, 15a may be mounted on sectional molds having cavities 17, 17a and a bottleneck defined by grooves 9, 9a of different sizes, blowing chamber 19 serving as intermediate between the air passage 23 and the cavity 7.

A shear plate 25 having a forward cutting edge 27 is removably mounted, by any known means, on the extruded plate 15a, in such manner as to project away therefrom whereby to overlap the other extruded plate 15 and the air passage 23.

An air blowing means is mounted on the shear plate 25, the blowing means including a nozzle 29 so located as to register with passage 23 when the sectional mold is closed. The air blowing means may be of the general type illustrated in FIGURE 3 consisting of an angular fitting 31 having at one end, a nipple 33 screwed into a receiving threaded hole 35 and, at the other end, a flexible air hose 37 connected to an air control valve 39 of a known type. The nipple 33 communicates directly with the air nozzle 29.

The supply of air for blowing the plastic tube comes in at 41 of the control valve 39, duct 43 supplying the air for controlling the operation of the valve 39 in the manner, for instance, illustrated and explained in my copending Canadian application No. 908,529.

Depending on the type of plastic material used, which is usually polyethylene, the pressure of the air will be about 40 to 100 p.s.i. and the volume will of course depend on the size of container desired. The particular conditions are already known in the art.

In the use of applicant's method and device, the sectional mold is closed over a portion 13 of the plastic parison 40 causing sealing of the lower end of tube 13 in known manner and also closure of the top end thereof with formation of a plug 42 in the passage 23. In closing, the shear plate 25 will cause severing of the tube 13 off the parison 40, the forward cutting edge 27 of shear plate 25 being preferably blunt as shown in FIGURE 3. In order to ensure complete severance of tube 13 from parison 40, it is proposed to provide a transverse slot 46 on the mold section 15, running parallel to the abutting face of the mold section 1 and so distant from the said abutting wall that the parison end overlies the said slot 46 when the sectional mold is closed as shown in FIGURE 3.

As known in the art, it is suggested that shallow cavities 47 (FIGURE 2) be provided on the abutting walls of the mold sections 1 and 3, at the shoulder and bottleneck area of the container 13 to receive extra plastic material when the sectional mold closes whereby to reduce as much as possible the membrane 49 caused by the pinching of the plastic material.

As shown in FIGURE 1, extruder pistons 51 are provided across extruder plate 15, 15a to remove the formed container when the mold opens. As is known, such extruder is moved out of its bore to cause ejection of the container during the opening movement of the sectional mold. It is pressed out of its housing and into the blowing chamber 19 by a conveniently disposed abutting surface (not shown).

It will be understood that the method and device of the invention are applicable on any type of sectional molds the sections of which come to abut one another to define therein a molding cavity.

Although a specific embodiment of the invention has just been described, it will be understood that various modifications may be made thereto that are within the spirit of the invention, the scope of which will now be claimed.

I claim:
1. In blowing system for making hollow articles of plastic material from an extruded tube of such material the combination comprising:
   (a) a sectional mold formed of a pair of mold sections closable upon one another to define therein a cavity having the shape of the article to be molded;
   (b) said mold formed, when closed, with a through passage leading into said cavity, said through passage having a plug portion of said plastic material at one end thereof;
   (c) a shear plate on one of said mold sections projecting away therefrom and adapted to overlap the other mold section and said passage when said mold is closed, and
   (d) air blowing means mounted on said shear plate and having a nozzle so arranged with respect to said plug portion as to blow air therethrough into said passage when said mold is closed about a portion of said extruded plastic tube to seal the ends thereof, to expand it into contact with said cavity.

2. A combination as claimed in claim 1 wherein said shear plate shears off said extruded tube from the portion thereof within said mold as said mold sections are moved to close the mold and a slot is provided on said other mold section, adjacent the corresponding abutting wall and parallel thereto, to ensure complete severance of said tube portion from said extruded tube.

3. A combination as claimed in claim 1 wherein each mold section has an extruder plate removably secured thereto having one edge flush with the corresponding abutting wall; said shear plate being removably secured over one of said extruder plates and said grooves being formed on the said edges flush with said abutting walls.

References Cited

UNITED STATES PATENTS 3,296,345   1/1967   Dietz.
3,358,062   12/1967   Lemelson.

FOREIGN PATENTS 1,172,419   10/1958   France.

WILBUR L. McBAY, Primary Examiner

U.S. Cl. X.R.

53—140